United States Patent [19]
Porter

[11] Patent Number: 6,072,565
[45] Date of Patent: Jun. 6, 2000

[54] NIGHT VISION DEVICE WITH IMPROVED LASER RANGE FINDER

[75] Inventor: Jerry Dayton Porter, Dallas, Tex.

[73] Assignee: Litton Systems, Inc., Woodland Hills, Calif.

[21] Appl. No.: 09/173,070

[22] Filed: Oct. 14, 1998

Related U.S. Application Data

[63] Continuation-in-part of application No. 09/080,437, May 18, 1998.

[51] Int. Cl.[7] ............................... G01C 3/08; H04N 7/00; H01J 31/50
[52] U.S. Cl. ............................ 356/5.04; 348/31; 359/353
[58] Field of Search .................................. 356/5.01, 5.04; 359/353; 348/31

[56] References Cited

U.S. PATENT DOCUMENTS

| | | |
|---|---|---|
| 4,037,132 | 7/1977 | Hoover . |
| 4,442,349 | 4/1984 | Blom et al. . |
| 4,882,481 | 11/1989 | Gilligan et al. . |
| 5,035,472 | 7/1991 | Hansen . |
| 5,084,780 | 1/1992 | Phillips . |
| 5,220,164 | 6/1993 | Lieber et al. . |
| 5,694,203 | 12/1997 | Ogawa ................................. 356/5.04 |
| 5,756,989 | 5/1998 | Bear et al. . |
| 5,877,851 | 3/1999 | Stann et al. ............................ 356/5.09 |
| 5,892,617 | 4/1999 | Wallace ................................ 359/353 |

*Primary Examiner*—Stephen C. Buczinski

[57] ABSTRACT

An integrated night vision device and laser range finder (10) provides night-time imaging of a scene by use of an image intensifier tube (14), as well as providing laser range finding operations. In a laser range finder mode of operation the device (10) projects a pulse of laser light into a scene being viewed, and a power supply and laser range finder circuit (50) of the device (10) temporarily utilizes the image intensifier tube (14) as a sensor to detect reflected laser light. During laser range finding, imaging is cut off for a very short time interval, and the image intensifier tube provides an electrical output signal in response to receipt of reflected laser light. A detection circuit (86, 86') associated with the image intensifier tube (10) receives the electrical output signal from the image intensifier tube (14), and includes a magnetic circuit. Oscillation in the magnetic circuit is effected by the electrical output signal of the image intensifier tube (14). A frequency comparator circuit, or phase detector circuit provides an electrical timer-stop output signal in response to a change in a frequency or phase relationship, respectively, of oscillations in the magnetic circuit.

14 Claims, 3 Drawing Sheets

NIGHT VISION DEVICE WITH IMPROVED LASER RANGE FINDER

CROSS REFERENCE TO RELATED APPLICATION

This application is a continuation-in-part of U.S. patent application Ser. No. 09/080,437, filed May 18, 1998, entitled, "Night Vision Device and Laser Range Finder", the disclosure of which is incorporated herein by reference to the extent necessary for a complete and enabling disclosure of the present invention.

BACKGROUND OF THE INVENTION

1. Field of the Invention

The present invention is in the field of night vision devices of the light amplification type. More particularly, the present invention relates to an improved night vision device having an image intensifier tube ($I^2T$) which serves as a detector for the reflected portion of a laser light pulse which is utilized to effect laser range finding. Thus, the present invention is also in the field of laser range finders. Particularly, the present invention relates to a night vision device and laser range finder using magnetic coupling of an electrical response caused by the reflected portion of a laser light pulse to a oscillator circuit utilizing phase matching or phase difference detection, for example, to provide an electrical output response. A method of operating the night vision device and a method of laser range finding (LRF) are disclosed also.

2. Related Technology

Laser range finders have been known for a considerable time. These devices are used, for example, by surveyors to calculate the distance from a point of observation to an object such as a geological formation in the field of view (i.e., the device requires line of sight relationship between a user and the object to be ranged). Generally, a laser range finder operates by projecting a pulse of laser light at an object. The laser light illuminates the object, and a portion of the laser light is reflected back toward the laser range finder device. The reflected laser light is detected, and the time interval required for the laser light pulse to travel to and from the object is measured. From this time interval measurement and the known speed of light, the distance between the laser range finder and the object is calculated.

A conventional laser range finder of the type described above generally includes a laser capable of producing laser light pulses of high peak power and very short duration (i.e., less than 50 ns duration). The detector for the reflected laser light may include a high speed photodetector (such as an InGaAs avalanche photodiode), which is coupled to a high gain, high speed amplifier. A high speed digital counter may be used as a timer to determine the time interval required for the laser light to travel to the object and for laser light reflecting off of the object to travel back to the device. From this time interval information an internal electronic calculator determines the range to the object, and this range is presented to the user of the device, usually on a visual display screen.

These conventional laser range finders have the disadvantage of a considerable cost and complexity. The laser pulses must be of considerable intensity as well, which requires a high power laser. The conventional laser range finders are subject to optical and electrical problems, such as vulnerability to electromagnetic interference, damage to electrical components and damage to optical components. Reliability of the devices is also adversely impacted by their complexity.

On the other hand, conventional night vision devices of the image intensification type (i.e., light amplification) type have also been known for a considerable time. Generally, these night vision devices include an objective lens which focuses invisible infrared light from the night time scene onto the transparent light-receiving face of an image intensifier tube. At its opposite image-face, the image intensifier tube provides an image in visible yellow-green phosphorescent light, which is then presented to a user of the device via an eye piece lens.

Even on a night which is too dark for natural human vision to allow a person to see well, invisible infrared light is richly provided by the stars in the night time sky. Human vision can not utilize this infrared light from the stars because the so-called near-infrared portion of the spectrum is invisible for humans. A night vision device of the light amplification type can provide a visible image replicating the night time scene.

A contemporary night vision device will generally use an image intensifier tube with a photocathode behind the light-receiving face of the tube. The photocathode is responsive to photons of infrared light to liberate photoelectrons. These photoelectrons are moved by a prevailing electrostatic field to a microchannel plate (MCP) having a great multitude of dynodes, or microchannels with an interior surface substantially defined by a material having a high coefficient of secondary electron emissivity. The photoelectrons entering the microchannels cause a cascade of secondary emission electrons to move along the microchannels so that a spatial output pattern of electrons which replicates an input pattern, and at a considerably higher electron density than the input pattern results. This pattern of electrons is moved from the microchannel plate to a phosphorescent screen to produce a visible image. A power supply for the image intensifier tube provides the electrostatic field potentials referred to above, and also provides a field and current flow to the microchannel plate.

Conventional night vision devices which are usable to sight a weapon are found in U.S. Pat. No. 5,084,780; and 5,035,472. Neither of these patents is believed to suggest or disclose a night vision device which is combined with a laser range finder using the image intensifier tube of the night vision device as a detector for laser light in the laser range finder. Further, no conventional technology known to the Applicant utilizes magnetic coupling of an electrical response signal created in the image intensifier tube by the reflected portion of a laser light pulse into an electrical detector circuit utilizing an reference oscillator and responding to, for example, a resulting phase difference or phase matching of the reference oscillator with a signal oscillator.

SUMMARY OF THE INVENTION

In view of the deficiencies of the conventional related technology, it would be desirable to provide a single device which provides both night vision imaging and laser range finding functions.

Additionally, it would be desirable to provide a laser range finder which uses an image intensifier tube as a detector for reflected laser light from an object.

Still another advantage could be obtained by provision of such a device which utilizes the image intensifier tube as a detector for reflected laser light in the LRF function, and which also includes an electrical detection circuit utilizing the occurrence of a phase match or phase difference, for example, between a reference oscillator and a signal oscillator in order to provide an electrical output signal in response to the detection within the image intensifier tube of the reflected portion of a laser light pulse, therefore to provide an improved timing control signal for the LRF function.

An advantage of the present combined night vision device and laser range finder is that a single device is provided of considerably less expense and of considerably improved durability in comparison to the conventional technology providing these functions in two separate devices. The laser pulses needed for laser range finding can be of remarkably lower power than those required by a conventional laser range finder. This further decreases the cost of the device because of the lower cost of a lower power laser, and the decreased energy usage of the device as well.

Other objects, features, and advantages of the present invention will be apparent to those skilled in the art from a consideration of the following detailed description of a preferred exemplary embodiment thereof taken in conjunction with the associated figures which will first be described briefly.

DETAILED DESCRIPTION OF EXEMPLARY PREFERRED EMBODIMENTS OF THE INVENTION

While the present invention may be embodied in many different forms, disclosed herein are two specific exemplary embodiments which illustrate and explain the principles of the invention. It should be emphasized that the present invention is not limited to the specific embodiments depicted and described herein.

Figure 1:
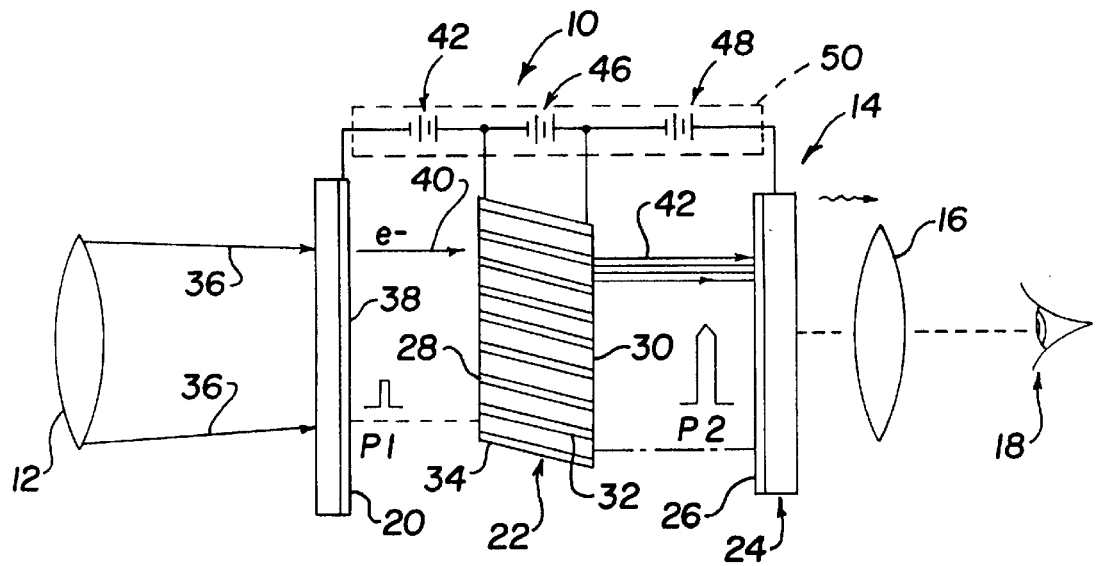
FIG. 1 is a schematic representation of an integrated night vision device and laser range finder embodying the present invention.

Referring first to FIG. 1, there is shown schematically the basic elements of one version of an integrated night vision device and laser range finder 10. Particulars of the laser range finding (LRF) operation of the device are presented below. In order to provide night vision, the device 10 generally comprises a forward objective optical lens assembly 12 (illustrated schematically as a single lens, although those ordinarily skilled will understand that the objective lens assembly 12 may include plural lens elements). This objective lens 12 focuses incoming light from a distant scene through the front light-receiving end 14a of an image intensifier tube 14 (as will be seen, this surface is defined by a transparent window portion of the tube, to be further described below). As was generally explained above in the discussion of the related technology, the image intensifier tube 14 provides an image at light output end 14b in phosphorescent yellow-green visible light. This image replicates the scene being viewed by use of the device 10.

The scene being viewed by use of device 10 may be a dark night-time scene which is invisible, or is only poorly visible with natural human vision to the user of the device 10. The visible image from tube 14 is presented by an eyepiece lens illustrated schematically as a single lens 16 producing at the user's eye (indicated with arrowed reference numeral 18) a virtual image of the rear light-output end 14b of the tube 14.

More particularly, image intensifier tube 14 includes a photocathode 20 which is responsive to photons of light at the deep red end of the visible spectrum and in the near-infrared portion of the spectrum to liberate photoelectrons in a pattern replicating the scene being viewed, a microchannel plate (MCP) 22 which receives the photoelectrons in the pattern replicating the scene, and which provides a greatly amplified pattern of electrons also replicating this scene, and a display electrode assembly 24 having an aluminized phosphor coating or phosphor screen 26. A transparent window portion 24a of the assembly 24 carries the electrode 24 and screen 26, and also conveys the image from screen 26 outwardly of the tube 14 so that it can be presented to the user 18. Window portion 24a outwardly defines surface 14b.

Still more particularly, MCP 22 is located just behind photocathode 20, with the MCP 22 having an electron-receiving face 28 and an opposite electron-discharge face 30. This MCP 22 further contains a plurality of angulated microchannels 32 which open on an electron-receiving face 28 and on an opposite electron-discharge face 30. Microchannels 32 are separated by passage walls 34. At least a portion of the surfaces of the walls 34 bounding the microchannels 32 is formed by a material having a high coefficient of emissivity of secondary electrons. Thus, the channels 32 of the MCP 22 are each effectively a dynode, emitting a shower of secondary electrons in response to receipt at face 28 of photoelectrons from photocathode 20.

The display electrode assembly 24, generally has a coated phosphor screen 26, and is located behind MCP 22 with phosphor screen 26 in electron line-of-sight communication with the electron-discharge face 30. This display electrode assembly 24 is typically formed of an aluminized phosphor screen 26 deposited on the vacuum-exposed surface of the optically transparent material of window portion 24a. The eyepiece lens 16 is located behind the display electrode assembly 24 and allows an observer 18 to view a correctly oriented image corresponding to the low level image (i.e., dim or perhaps invisible with natural human vision) of the scene being viewed.

As will be generally appreciated by those skilled in the art (now also viewing FIG. 2), the individual components of image intensifier tube 14 are all mounted and supported in a tube or chamber which is well understood in the pertinent art, and having forward and rear transparent plates cooperating to define a chamber which has been evacuated to a low pressure. This evacuation allows electrons liberated into the free space within the tube (i.e., the photoelectrons and secondary-emission electrons) to be transferred by prevailing electrostatic fields between the various components without atmospheric interference that could possibly decrease the signal-to-noise ratio.

As indicated above, photocathode 20 is mounted immediately behind objective lens 12 on the inner vacuum-exposed surface of the window portion of the tube and before MCP 22. It is upon this photocathode that the objective lens 12 actually focuses the image of the distant scene through the light-receiving window portion which defines surface 14a. Typically, this photocathode 20 is a circular disk-like structure having a predetermined construction of semiconductor materials, and is mounted on a substrate in a well known manner. Suitable photocathode materials are generally semi-conductors such as gallium arsenide; or alkali metals, such as compounds of sodium, potassium, cesium, and antimony (commercially available as S-20). The photocathode is carried on a readily available substrate which is transparent to light in the wavelength band of interest (i.e., ordinarily in the deep-red and near infrared portion of the spectrum, extending in some cases to the blue portion of the visible spectrum—but which is not necessarily transparent to all visible light). A variety of glass and fiber optic substrate materials are commercially available for this use.

Figure 2:
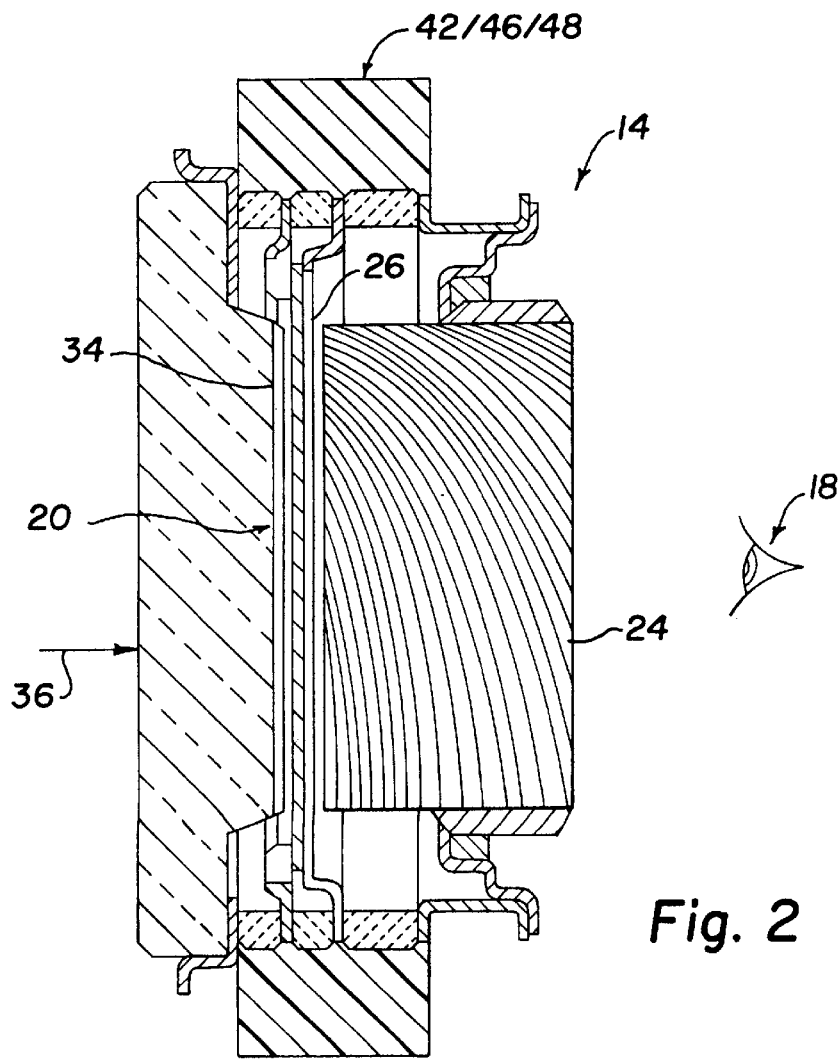
FIG. 2 shows a longitudinal cross sectional view of an image intensifier tube of the device seen in FIG. 1.

Still referring to FIG. 2, and considering in somewhat greater detail the operation of the image intensifier tube 14 in its mode of operation providing a visible image it is seen that in response to photons 36 entering the forward end of night vision device 10 and passing through objective lens 12, photocathode 20 has an active surface 38 from which are emitted photoelectrons in numbers proportionate to and at locations replicative of the received light from the scene being viewed. In general, at night the image received by the device 10 will be too dim to be viewed with human natural vision, and may be entirely or partially of infrared radiation which is invisible to the human eye. It is thus to be understood that the shower of photoelectrons emitted from the photocathode are representative of the image entering the forward end of image intensifier tube 14. The path of a typical photoelectron emitted from the photon input point on the photocathode 20 is represented in FIG. 1 by dashed line 40.

Photoelectrons 40 emitted from photocathode 20 gain energy by passage through an applied electrostatic field between the photocathode 20 and the input face 28. The applied electric field is of a predetermined intensity gradient and is established between photocathode 20 and electron-receiving face 28 by a power source diagrammatically depicted in FIG. 1 and indicated by the numeral 42. Typically, power source 42 will apply an electrostatic field voltage on the order of 200 to 800 volts to maintain an electrostatic field of the desired intensity. This field is most negative at photocathode 20 and is relatively most positive at the face 28 of MCP 22. Further, an electrostatic field most negative at photocathode 20 and most positive at output electrode 24 is maintained in the image intensifier tube 14, as will be seen. Thus, after accelerating over a distance between the photocathode 20 and the input face 28 of the MCP 22, these photoelectrons 40 enter microchannels 32.

As will be discussed in greater detail below, the photoelectrons 40 are amplified by emission of secondary electrons in the microchannels 32 to produce a proportionately larger number of electrons upon passage through MCP 22. This amplified shower of secondary-emission electrons 44, also accelerated by a respective electrostatic field applied by power source 46, then exits from the microchannels 32 of MCP 22 at electron-discharge face 30.

Once in free space again (i.e., in the vacuum environment inside of tube 14), the amplified shower of photoelectrons and secondary-emission electrons is again accelerated in an established electrostatic field provided by power source 48. This electrostatic field is established between the electron-discharge face 30 and display electrode assembly 24. Typically, the power source 48 produces a field on the order of 3,000 to 7,000 volts, and more preferably on the order of 6,000 volts in order to impart the desired energy to the multiplied electrons 44. The shower of photoelectrons and secondary-emission electrons 44 is several orders of magnitude more intense than the initial shower of photoelectrons 40, and is still in a pattern replicating the image focused on photocathode 20. This amplified shower of electrons 44 is propelled by the applied electrostatic field onto the phosphor screen 26 of display electrode assembly 24 to produce an image in visible light.

Figure 3:
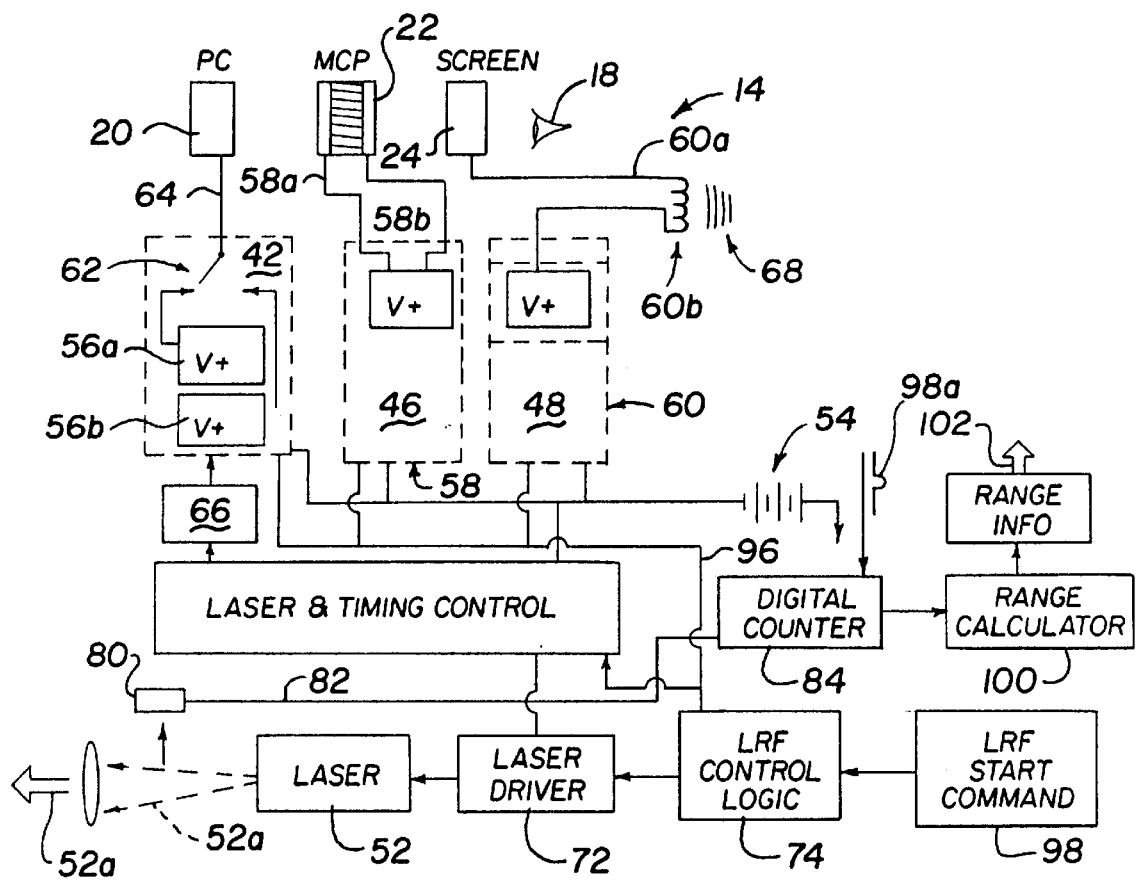
FIG. 3 provides a schematic illustration of a power supply and laser range finder circuit of the device.

Further, the electrically active components of the image intensifier tube 14 are individually connected electrically to a power supply and laser range finder circuit, generally indicated with numeral 50, which is schematically illustrated in FIG. 3. For purposes of completeness, this circuit 50 is schematically illustrated to also include the power sources diagrammatically illustrated in FIG. 1 and indicated with reference numerals 42, 46, and 48, as described above. However, those ordinarily skilled in the pertinent arts will recognize that the high-voltage power sources 42, 46, and 48 are conventionally encapsulated in unit with the image intensifier tube 14. Thus, the image tube 14 and circuit sections 42, 46, and 48 will be recognized by those ordinarily skilled in the pertinent art as an image tube module.

Further viewing FIG. 3, it is seen that another section of the circuit 50 powers and allows control of the operation of a laser 52 to controllably provide pulses of laser light which are projected into the scene being viewed, as is indicated on FIG. 3. The laser light is projected as a narrow beam that can be directed onto a selected object in the scene being viewed by user 18 using device 10. The circuit 50 also selectively operates the image intensifier tube 14 as a detector for the reflected portion of laser light which is returned from an object in the scene being viewed in order to allow timing of the interval required for the laser light pulses to travel from the device 10 to the selected object and back. Thus, a calculation of the range to a object illuminated by the laser light pulses can be obtained also by action of circuit 50.

Considering now FIG. 3, it is seen that the circuit 50 includes a power source, which in this case is illustrated as a battery 54. It will be appreciated that a battery 54 is generally used as the power source for portable apparatus, such as man-carried night vision devices. However, the invention is not limited to any particular power source. For example, a regulated line-power source could be used to provide input power to a power supply implementing and embodying the principles of the present invention. Considered generally, the circuit 50 includes three voltage multiplier sections, respectively indicated with the numerals 56, 58, and 60. These voltage multiplier sections effectively provide the power sources 42, 46, and 48 referenced above. However, the voltage multiplier 56 for the photocathode 20 includes two selectively-operable voltage multipliers of differing voltage level, indicated with the numerals 56a and 56b. A tri-stable switching network 62 selectively switches controllably between alternative conditions either conducting the photocathode 20 to voltage multiplier 56a, to voltage multiplier 56b, or to an open circuit position, all via the conductive connection 64. In other words, the switching network 62 alternatingly connects the photocathode 20 of the tube 14 to a voltage source at about −800 volts, or to a source at about +30 volts relative to the front face of the microchannel plate, as will be further seen. The open circuit interval of time employed in the present embodiment between connections of the photocathode 20 to the two voltage sources 56a and 56b is used for purposes of energy efficiency, and is optional. A duty cycle control 66 controls the switching position of the switching network 62. Power supply to the MCP 22 is effected from the voltage multiplier 58 via connections 58a and 58b.

The voltage multiplier 60 has connection to the screen 26 via a connection 60a. It will be noted that the conductor of connection 60a is schematically illustrated in FIG. 3 to form a primary winding section (indicated with arrowed numeral 60b) of a magnetic circuit indicated on FIG. 3 with arrowed reference numeral 68, so that current flow in this conductor 60a is electromagnetically (i.e., inductively) linked to a magnetic field of this magnetic circuit 68. Further explanation of the transformer or magnetometer 68 is provided in connection to the description of FIGS. 4 and 5.

Imaging

Having generally considered the structure of the circuit 50, attention may now be given to its operation, and the cooperation of this circuit operation with the operation of the image intensifier tube 14 to provide imaging. It will be noted that this imaging of a scene for a user of the device 10 may take place at night in conditions of viewing a scene under dark-field conditions, or during the day with the scene illuminated by sun light. By operation of the switching network 62, the photocathode 20 is controllably and cyclically changed between connection to the constant voltage source 56a, to an open circuit (i.e., voltage off), and to the lower voltage provided by source 56b (simulating darkness for the photocathode). This gating function is carried on at a constant frequency (preferably at about 50 Hz), with a constant cycle interval, while varying the duty cycle of the applied constant voltage from voltage multiplier 56a as a function of current level sensed at screen 26. The frequency of the duty cycle for the photocathode is sufficiently fast (i.e., somewhat above about 30 Hz) so that no flicker is perceived in the viewed image.

Laser Range Finding

Further considering now FIGS. 1 and 3, the operation of the device and circuit 50 to provide a laser range finder function will be explained. The device 10 will be recalled to include laser 52 which is capable of projecting a short-duration laser light pulse 52a into the scene being viewed by the operator of the night vision and laser range finder device 10 under control of the user 18 by operation of circuit 50. That is, the user 18 will place a reticule seen through eyepiece 16 on an object in the scene for which a range is desire, and will select operation of a laser range finding sequence, perhaps by pushing a switch button. The pulse of laser light projected from the device 10 is diagrammatically illustrated on FIG. 3 with the arrow 52a. Laser range finding operations are conducted by the device 10 temporarily (i.e., during a short laser range finding interval) using the image intensifier tube 14 as a detector providing an electrical output signal in response to the reflected laser light returned from the selected object in the scene being viewed.

After the range finding interval, the image tube 14 returns to its imaging function. The laser range finding interval is so short that it may not be noticed, or may be detected as merely a flicker in the image provided by the device 10.

Laser 52 is powered by a laser driver circuit portion of circuit 50, which portion is indicated with numeral 72. A laser range finder (LRF) control logic circuit portion 74 (the operation of which will be further explained below) provides a control input to the driver circuit 72 to effect operation of the laser 52, and also provides a control input to the power supply sections 56, 58, and 60 via a conductor 76. An operator-input command device 78 (which may take the form of a push button switch, for example) is provided, and by which the user 18 of the device 10 can indicate a command that a LRF operation is to be carried out be the device 10.

A Laser Range Finding Operation

Figure 4:
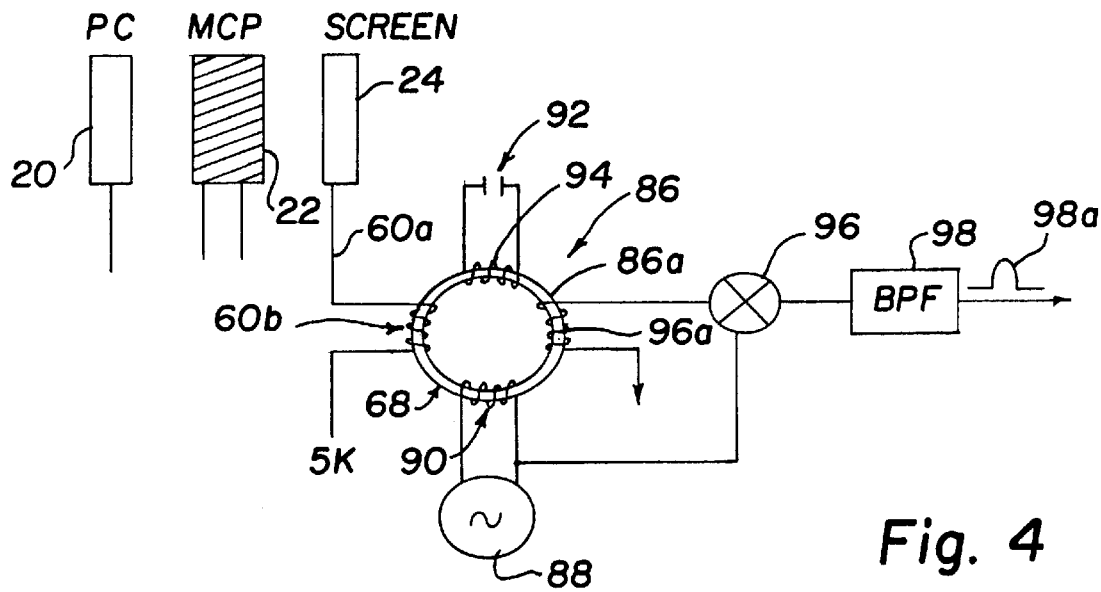
FIG. 4 schematically depicts a detector circuit utilized in the device of FIG. 1.

Considering FIG. 3 in conjunction with FIG. 4, it will be seen that when the operator —15 of the device 10 wishes to obtain range information to an object in the viewed field, the operator centers the object in the viewed scene, possibly by using a reticule provided by the device 10, so that the laser beam 52a will illuminate the object, and makes a LRF input command at device (switch) 78. In response to this input command, the LRF control logic circuit 74 effects the following sequential activities:

First, internal oscillators of the voltage multiplier sections 56, 58, and 60 are shut down to electrically quiet the circuit 50. The shutdown of voltage multiplier 58 is utilized to drive the MCP 22 to a high-gain differential voltage level. Preferably, this high-gain voltage level is a differential voltage of about 1200 volts across the MCP 22.

Second, the LRF control logic circuit 74 commands the switching network 62 to perform a timed switching operation (as is further described below), first switching photocathode 20 to the voltage from multiplier 56b (i.e., to +30 volts relative to the front face of MCP 22—effecting a hard turn off for the photocathode 20 of the tube 14); and then later in timed relation connecting this photocathode to source 56a.

Third, after a time interval of about 3 ms (which is required to allow the oscillators to stop their operation), the laser light pulse 52a is fired. In timed relation, the photocathode 20 is then effectively switched to the voltage source of multiplier 56a (i.e., to about −800 volts). Actually, the photocathode 20 is switched to voltage source 56a in timed relation before the laser light pulse is fired. The photocathode needs to settle for about 200 μs before the laser is fired.

Fourth, shortly after the time the LRF control logic commands the laser 52 to fire pulse 52a of laser light into the scene which is being viewed by the user of the device 10, this pulse will actually be fired. A time-zero ($t_0$) detector 80 detects the moment of actual firing of this laser light pulse, and provides a signal on conductor 82 which starts a high-speed digital timer 84. Prior to the moment of firing of this laser light pulse 70a, the photocathode 20 is connected to voltage source 56b (i.e., to the +30 volts relative source) for a purpose to be further explained below.

Fifth, when a portion of the laser light pulse 52a reflects from an object in the scene, returning laser light (still in the form of a pulse, but now including a considerable noise element) passes to image intensifier tube 14 causing a corresponding pulse of photoelectrons to be released by photocathode 20, as is graphically depicted on FIG. 1 and indicated with the character "P1". Those ordinarily skilled in the pertinent arts will know that the graphical pulse illustration of FIG. 1 is greatly simplified, and that the returning laser light pulse will almost certainly not have the illustrated square-wave configuration, and will include a considerable noise constituent. The pulse P1 of photoelectrons passes to MCP 22, and causes a corresponding pulse of secondary-emission electrons "P2" (produced under "high gain" conditions for the microchannel plate 22), which electrons pass to the output electrode assembly 24. A corresponding pulse in the current flow from screen 26 results.

Turning to FIG. 4, it is seen that the corresponding pulse of current from screen electrode 26 is inductively coupled by coil winding section 60b (part of conductor 60) into a magnetometer detector circuit 86, having a magnetometer 86a of ring-core configuration. The ring core magnetometer 86 provides magnetic circuit 68. This ring-core magnetometer receives an oscillator input signal from oscillator circuit 88 via corresponding coil winding section 90, which signal drives oscillation in a resonating capacitor 92 via a corresponding coil winding section 94. When the pulse of current from the screen 26 is not present (i.e., during a LRF operation prior to the return of reflected laser light to the device 10), the magnetometer 86 has a condition of stable oscillation. A coil winding section 96a provides an input to a frequency comparator 96, which when no change in the frequency of operation of the magnetometer 86 is effected, provides no output via a band pass filter 98 because the frequency of the oscillator and of the tank circuit 92/94 remain in synchronization.

On the other hand, when the laser light pulse reflected from an object in the scene causes pulse P2, the resulting pulse of current flow from the screen 26 is magnetically coupled into magnetometer 86, and disrupts the frequency of operation of the oscillator/capacitor combination 88/92. This change in frequency of the oscillator is detected by the frequency, and results in the band pass filter 98 providing an output signal 98a (depicted graphically on FIG. 4), the shape and duration of which is indicative of the extent and duration of the disruption of the stable oscillation of the detector 86 by the pulse P1 in its electrical form. The output signal from band pass filter 98 effectively ignores the noise component of the signal originating with the returning pulse of laser light. The band pass filter 98 provides an output signal 98a, which is passed to the timer 84 to provide a timer-stop command. Next, the internal oscillators of the power supplies 56,58, and 60 are restarted, and the image of the scene being viewed is thus restored for the user of the device 10.

During the LRF operation, the operator of the device 10 may detect a flicker in the viewed image along with a very brief flash of light (i.e., from the pulse of electrons P2 impacting the screen 26). The LRF operation takes only about 5 ms to complete so the user's view of the scene in not significantly interrupted. The time interval between the to signal and the timer-stop command is provided by the timer 84 to a range calculator 100, which then supplies an output indicated by the arrowed numeral 102 (for example, by use of a numerical display, such as a liquid crystal display unit—not shown) of sensible range information for the user 18 of distance from the device 10 to the selected object in the scene being viewed.

Figure 5:
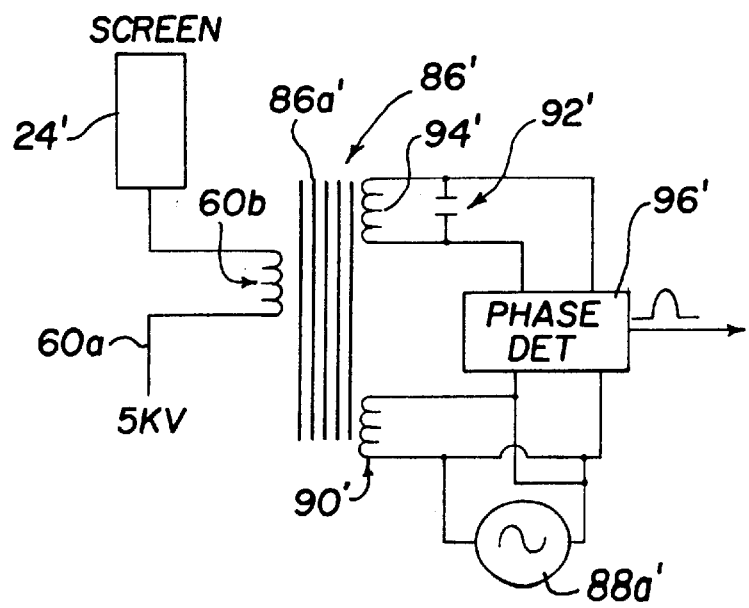
FIG. 5 schematically depicts an alternative embodiment of a detector circuit which may be utilized in the device of FIG. 1.

FIG. 5 provides a fragmentary view of an alternative embodiment of the present invention. In order to obtain reference numerals for use in describing this alternative embodiment, features which are the same as, or which are analogous in structure or function to, featured depicted and described above by reference to FIGS. 1–4 are indicated on FIG. 5 using the same numeral used above, and with a prime (') added. Viewing FIG. 5, is seen that a detector circuit 86' is depicted, which in this case is not a frequency change detector, but is a heterodyne phase shift detector. The circuit 86' includes an oscillator 88' having an input coil section 90' driving into a transformer core 86a'. In this embodiment, the core 86a provides magnetic circuit 68.

The primary winding section 60b' in this embodiment also has an inductively coupled input to this transformer core. A resonating capacitor 92' is coupled by a coil section 94' with the core 86a', and provides a oscillator phase signal to a phase detector 96'. The phase detector 96' also receives an input from the oscillator 88' directly, so that when the pulse of current from screen 26 is not present, there is a stable phase relationship between the signals provided into phase detector 96' on the one hand from oscillator 88', and on the other hand from the signal from resonating capacitor 92' and coil section 94'. Again, when the pulse occurs from screen 26, this pulse disrupts the stable phase relationship explained above by its inductive coupling into the transformer core 86a'. The resulting phase change results in an output signal 96a' from phase detector 96', which is utilized as a timer-stop command, as was explained above.

Those ordinarily skilled in the pertinent arts will appreciate that the embodiments of the present invention depicted and described herein and above are not exhaustive of the invention. Those skilled in the arts will further appreciate that the present invention may be embodied in other specific forms without departing from the spirit or central attributes of the invention. Because the foregoing description of the present invention discloses only exemplary embodiments, it is to be understood that other variations are recognized as being within the scope of the present invention. Accordingly, the present invention is not limited to the particular embodiments which have been depicted and described in detail herein. Rather, reference should be made to the appended claims to define the scope and content of the present invention.

I claim:

1. A range finder apparatus, said range finder apparatus being usable in conjunction with a source of energy providing an energy pulse projecting toward an object the range to which is to be determined so that a portion of the energy pulse reflects from the object back to the apparatus, said apparatus comprising:

an image intensifier tube receiving energy reflected from the object and responsively providing an electrical output;

a detection circuit receiving said electrical output and responsively providing a timer-stop signal upon detection of a phase change in a magnetic circuit, said detection circuit including an oscillator driving oscillation in the magnetic circuit, and means for detecting the phase change in said magnetic circuit;

a timer device for measuring a time interval from projection of said energy pulse until provision of said timer-stop signal; and a calculator determining the range from the apparatus to the object using said time interval and the speed of said energy pulse as a measuring standard.

2. The range finder apparatus of claim 1 wherein said source of energy includes a laser, and said energy pulse includes a pulse of laser light.

3. The range finder apparatus of claim 1 wherein said timer circuit includes a detector responding to projection of said energy pulse to provide a timer-start signal, and a timer responding to said timer start signal to begin timing said time interval.

4. A laser range finder apparatus, said apparatus comprising:

a laser light source projecting a pulse of laser light toward an object the range to which is to be determined so that a portion of the projected laser light illuminates the object and is reflected back toward the apparatus;

an image intensifier tube receiving reflected laser light and responsively providing an electrical output;

a detection circuit receiving said electrical output and responsively providing a timer-stop signal upon detection of a phase change in a magnetic circuit, said detection circuit including an oscillator driving oscillation in the magnetic circuit, and means for detecting the phase change in said magnetic circuit;

a timer device for measuring a time interval from projection of said pulse of laser light until provision of said timer-stop signal; and a calculator determining the range from the apparatus to the object using said time interval and the speed of light as a measuring standard.

5. The laser range finder of claim 4 wherein further includes a phase detector responding to said change in oscillation phase to provide said timer-stop signal.

6. The laser range finder of claim 4 wherein said image intensifier tube includes a photocathode, a microchannel plate, and a screen electrode, said screen electrode providing said electrical output in response to receipt by said image intensifier tube of reflected laser light.

7. A night vision device comprising:
an objective lens receiving light from a scene;
an image intensifier tube receiving light from the scene via the objective lens and responsively providing a visible image of the scene, an eyepiece lens providing the visible image to a user of the night vision device;
a laser projecting a pulse of laser light into the scene, a portion of this pulse of laser light reflecting from an object in the scene to provide a reflected laser light pulse;
circuit means causing said image intensifier tube to provide an electrical output in response to receipt of said reflected laser light pulse and responsively providing a timer-stop signal upon detection of a phase change in a magnetic circuit, said circuit means including an oscillator driving oscillation in the magnetic circuit, and means for detecting the phase change in said magnetic circuit;
a timer measuring an interval from the time of projection of said pulse of laser light until the time of provision of said electrical output by said image intensifier tube;
a calculator determining range information indicative of the distance from the night vision device to the object using said time interval and the speed of light as a measuring standard; and
means for providing said range information to a user of the device.

8. An integrated night vision device and laser range finder apparatus, said apparatus including an image intensifier tube and providing in one mode of operation a visible image of a scene, and another mode of operation providing range information indicative of distance from the apparatus to a selected object in the scene, said apparatus comprising:
an image tube power supply section, said image tube power supply section providing respective operating voltage levels for each of: a photocathode, to respective first and a second facial electrodes of a microchannel plate, and to an output electrode of the image intensifier tube;
an operator-input device for receiving an LRF operator input command selecting laser range finding mode of operation;
a laser in response to said LRF command providing a laser light pulse projecting into the scene to illuminate the selected object;
a time-zero detector responsive to projection of said laser light pulse to provide a time-zero output signal;
an interval timer starting in response to the time-zero output signal;
a laser range finding control logic unit for providing operating control commands to said image tube power supply section to in response to a LRF command momentarily suspend imaging operation, and charging the microchannel plate of said image intensifier tube to a high-gain voltage differential between said first and second facial electrodes;
an electrical connection to said output electrode to detect an impulse current indicative of reflected laser light returning to said image intensifier tube from an object in the scene, said electrical connection providing said impulse current to a magnetic circuit;
means for detecting application of said impulse current to said magnetic circuit and responsively providing a timer-stop signal measuring a time interval upon detection of a phase change in a magnetic circuit; and
a calculator using said time interval and the speed of light as a measuring standard to determine range from said apparatus to the selected object.

9. A combined night vision and laser range finder device, said device comprising:
an objective lens through which light from a scene being viewed is received, said objective lens directing light from the scene to an image intensifier tube providing a visible image of the scene and an electrical output in response to receipt of reflected laser light;
a laser light source projecting a pulse of laser light outwardly through said objective lens in to the scene being viewed;
said image intensifier tube receiving reflected laser light from the object and responsively providing an electrical output; and
means for measuring a time interval from projection of said pulse of laser light until provision of said electrical output by said image intensifier tube, said time interval measuring means including a magnetic circuit, means for driving oscillation in said magnetic circuit, means for applying said electrical output to said magnetic circuit to effect an oscillation change therein, and means for detecting said oscillation change;
means for calculating the range from the device to the object using said time interval and the speed of light as a measuring standard.

10. A method of operating a night vision device in order to provide both a visible image and range finding, said method comprising steps of:
providing the device with an image intensifier tube, and directing light from a scene to the image intensifier tube;
causing the image intensifier tube to responsively provide a visible image;
projecting a pulse of light into the scene, and causing a portion of this pulse of light to be reflected from an object in the scene to the image intensifier tube;
in response to the reflected portion of the pulse of light causing said image intensifier tube to provide an electrical response;
providing a magnetic circuit, and driving oscillation therein; applying said electrical response to said magnetic circuit to effect a change in said oscillation;
detecting said change in oscillation of said magnetic circuit; and
measuring a time interval between projection of said pulse of light and detection of said change in oscillation of said magnetic circuit, and responsively providing range information indicative of a range from the device to the object using said time interval and the speed of light as a measuring standard.

11. A method of using an image intensifier tube to measure a range to an object, said method comprising steps of:
projecting a pulse of light to the object and causing a portion of this pulse of light to be reflected from the object to the image intensifier tube;
utilizing said image intensifier tube to provide an electrical response to receipt of the reflected light;

providing an oscillating magnetic circuit receiving said electrical response to provide a timer-stop signal in response to said electrical response;

measuring a time interval from projection of said pulse of light until provision of said timer-stop signal; and from said time interval determining the range to the object using the speed of light as a measuring standard.

12. The method of claim 11 further including the steps of preparing said image intensifier tube to provide the electrical output signal by applying a determined high-gain voltage across a microchannel plate of the image intensifier tube preparatory to provision of said electrical response.

13. The method of claim 11 further including the steps of preparing said image intensifier tube to provide the electrical output by first applying a relative positive voltage to a photocathode of the image intensifier tube during projection of said pulse of light, and thereafter applying a constant negative voltage to the photocathode during receipt of reflected light at the image intensifier tube.

14. A method of determining a range from a location to an object comprising steps of:

projecting a pulse of light from the location to the object via an objective lens and causing a portion of this pulse of light to be reflected from the object back to the location and through the objective lens;

providing an image intensifier tube at the location;

utilizing said image intensifier tube both to provide a visible image from light received via said objective lens and to provide an electrical response to receipt of the reflected light pulse portion;

electrically connecting said image intensifier tube with a magnetic circuit having an oscillator so as to apply said electrical response thereto to modify oscillation of said magnetic circuit;

measuring a time interval from projection of said pulse of light until said modification of oscillation in said magnetic circuit; and from said time interval determining the range from the location to the object using the speed of light as a measuring standard.

* * * * *